United States Patent
Kim (10) Patent No.: US 9,663,029 B2
(45) Date of Patent: May 30, 2017

(54) METHOD OF CONTROLLING BUTTON SYMBOL OF INSIDE MIRROR

(71) Applicant: Hyundai Motor Company, Seoul (KR)

(72) Inventor: Won Gil Kim, Whasung-Si (KR)

(73) Assignee: Hyundai Motor Company, Seoul (KR)

( * ) Notice: Subject to any disclaimer, the term of this patent is extended or adjusted under 35 U.S.C. 154(b) by 151 days.

(21) Appl. No.: 14/563,080

(22) Filed: Dec. 8, 2014

(65) Prior Publication Data
US 2015/0336506 A1 Nov. 26, 2015

(30) Foreign Application Priority Data

May 23, 2014 (KR) .......................... 10-2014-0062384

(51) Int. Cl.
| | |
|---|---|
| *B60Q 1/00* | (2006.01) |
| *G08B 21/00* | (2006.01) |
| *G08B 17/10* | (2006.01) |
| *G02F 1/03* | (2006.01) |
| *G02F 1/153* | (2006.01) |
| *G02B 5/08* | (2006.01) |
| *G02B 27/14* | (2006.01) |

(Continued)

(52) U.S. Cl.
CPC ........... *B60Q 3/0293* (2013.01); *B60Q 3/023* (2013.01); *B60Q 3/0286* (2013.01); *B60R 1/04* (2013.01); *B60R 1/12* (2013.01); *B60R 2001/1215* (2013.01)

(58) Field of Classification Search
CPC .... B60R 2001/1215; B60R 2001/1223; B60R 1/088; B60R 2001/1253; B60Q 3/0293; B60Q 3/023; B60Q 1/14
See application file for complete search history.

(56) References Cited

U.S. PATENT DOCUMENTS 4,792,783 A * 12/1988 Burgess ................. B60K 35/00
307/10.1
5,530,240 A * 6/1996 Larson ................... B60Q 3/048
250/206

(Continued)

FOREIGN PATENT DOCUMENTS

JP 09-123924 A 5/1997
JP 2001-354087 A 12/2001

(Continued)

*Primary Examiner* — Steven Lim
*Assistant Examiner* — Muhammad Adnan
(74) *Attorney, Agent, or Firm* — Morgan Lewis & Bockius LLP (57) ABSTRACT

Disclosed is a method of controlling lights of symbols for a frameless inside mirror that includes operation buttons, symbols and lighting means. The method controls the lights according to a selected symbol light mode. The method may include turning on all of the lights for the symbols in a symbol light on mode when an operation of pushing a symbol light button is recognized in a symbol light off mode, turning off all of the lights for the symbols in the symbol light off mode when an operation of pushing the symbol light button is recognized in the symbol light on mode, and turning on all of the lights for the symbols for a predetermined time period in a symbol light temporary on mode when an operation of pushing any other operation symbol or symbols except those for the symbol light button and the SOS button is recognized in the symbol light off mode.

9 Claims, 9 Drawing Sheets

(51) Int. Cl.
*G02B 7/182* (2006.01)
*B60Q 3/02* (2006.01)
*B60R 1/04* (2006.01)
*B60R 1/12* (2006.01)

(56) References Cited

U.S. PATENT DOCUMENTS

| | | | | |
|---|---|---|---|---|
| 5,550,677 A * | 8/1996 | Schofield | ............... | B60N 2/002 |
| | | | | 348/E7.086 |
| 5,666,028 A * | 9/1997 | Bechtel | ............... | B60Q 1/1423 |
| | | | | 307/10.8 |
| 5,734,928 A * | 3/1998 | Nakasuji | ................ | G06F 3/023 |
| | | | | 708/146 |
| 5,796,094 A * | 8/1998 | Schofield | ............... | B60N 2/002 |
| | | | | 250/208.1 |
| 5,831,389 A * | 11/1998 | Kawashima | ......... | B60Q 3/0293 |
| | | | | 307/10.8 |
| 5,878,353 A * | 3/1999 | ul Azam | ................... | B60R 1/12 |
| | | | | 455/566 |
| 6,198,409 B1 * | 3/2001 | Schofield | ................. | B60R 1/12 |
| | | | | 280/728.1 |
| 6,260,859 B1 * | 7/2001 | Dixon | ................... | B60G 17/005 |
| | | | | 280/5.514 |
| 6,330,101 B1 * | 12/2001 | Yamamoto | .............. | B60R 1/088 |
| | | | | 345/105 |
| 6,614,579 B2 * | 9/2003 | Roberts | ................ | B60Q 1/2665 |
| | | | | 250/208.1 |
| 7,012,384 B2 * | 3/2006 | Tatewaki | ............... | B60Q 3/0293 |
| | | | | 315/312 |
| 7,084,859 B1 * | 8/2006 | Pryor | ................. | G01C 21/3664 |
| | | | | 345/156 |
| 7,224,324 B2 * | 5/2007 | Quist | ........................ | B60R 1/12 |
| | | | | 178/18.06 |
| 7,253,723 B2 * | 8/2007 | Lindahl | .................... | B60R 1/12 |
| | | | | 340/425.5 |
| 7,327,215 B2 * | 2/2008 | McCall | .................... | B60R 1/12 |
| | | | | 248/479 |
| 7,445,392 B2 * | 11/2008 | Straehle | ................... | B60R 1/002 |
| | | | | 296/1.11 |
| 7,477,137 B2 * | 1/2009 | Matsumoto | .......... | B60Q 1/2665 |
| | | | | 280/735 |
| 7,488,080 B2 * | 2/2009 | Skiver | ...................... | B60R 1/12 |
| | | | | 340/425.5 |
| 7,532,149 B2 * | 5/2009 | Banko | ...................... | B60R 1/12 |
| | | | | 342/20 |
| 7,817,020 B2 * | 10/2010 | Turnbull | ................ | B60Q 3/023 |
| | | | | 340/438 |
| 8,465,161 B2 * | 6/2013 | DeWind | ........................ | 359/871 |
| 8,643,481 B2 * | 2/2014 | Campbell | ..................... | 340/438 |
| 9,346,403 B2 * | 5/2016 | Uken | ........................ | B60R 1/12 |
| 2001/0012206 A1 * | 8/2001 | Hayami | ................ | B60Q 1/085 |
| | | | | 362/464 |
| 2004/0245352 A1 * | 12/2004 | Smith | ................ | G05D 23/1904 |
| | | | | 236/94 |
| 2005/0231969 A1 * | 10/2005 | Fogg | .................... | B60Q 1/2665 |
| | | | | 362/494 |
| 2005/0264891 A1 * | 12/2005 | Uken | ........................ | B60R 1/12 |
| | | | | 359/606 |
| 2006/0082541 A1 * | 4/2006 | Wu | ........................ | H03M 11/24 |
| | | | | 345/156 |
| 2006/0133099 A1 * | 6/2006 | Thannikary | ............... | B60Q 1/24 |
| | | | | 362/459 |
| 2009/0243882 A1 * | 10/2009 | Brown | .................... | G08G 1/162 |
| | | | | 340/905 |
| 2010/0091394 A1 * | 4/2010 | DeWind | .................... | B60R 1/12 |
| | | | | 359/838 |
| 2010/0097469 A1 * | 4/2010 | Blank | ........................ | B60R 1/12 |
| | | | | 348/148 |
| 2010/0102753 A1 * | 4/2010 | Pilz | ........................ | H05B 37/0263 |
| | | | | 315/295 |
| 2012/0068839 A1 * | 3/2012 | Campbell | ................. | B60R 1/12 |
| | | | | 340/438 |
| 2012/0069444 A1 * | 3/2012 | Campbell | ................ | B60R 1/12 |
| | | | | 359/630 |
| 2012/0105481 A1 * | 5/2012 | Baek | .................... | G06F 3/04886 |
| | | | | 345/652 |
| 2012/0236388 A1 * | 9/2012 | De Wind | .................. | B60R 1/04 |
| | | | | 359/267 |
| 2014/0144272 A1 * | 5/2014 | Kato | ........................ | B60K 20/08 |
| | | | | 74/473.19 |
| 2014/0300457 A1 * | 10/2014 | Geerlings | .......... | G07C 9/00309 |
| | | | | 340/438 |

FOREIGN PATENT DOCUMENTS

| | | |
|---|---|---|
| JP | 2002-264726 A | 9/2002 |
| KR | 10-2005-0117570 A | 12/2005 |
| KR | 10-2005-0120022 A | 12/2005 |
| KR | 20-0419398 Y1 | 6/2006 |
| KR | 10-2010-0123435 A | 11/2010 |
| KR | 10-2011-0078721 A | 7/2011 |

* cited by examiner

[ 'A-A' Section ]

[ 'B-B' Section ]

| Button classification | Symbol light mode | Light state - Button release | Light state - Button release | Report to ETCS, TMU (existence/nonexistence) | Remarks |
|---|---|---|---|---|---|
| ETCS power button | Symbol light on mode | H/L | H/L OFF | O | |
| | Symbol light off mode | All lights on | All lights on for 10s | X | |
| | Symbol light temporary mode | H/L | H/L OFF | O | |
| Balance inquiry button | Symbol light on mode | H/L | H/L OFF | O | |
| | Symbol light off mode | All lights on | All lights on for 10s | X | |
| | Symbol light temporary mode | H/L | H/L OFF | O | |
| Volume button | Symbol light on mode | H/L | H/L OFF | O | |
| | Symbol light off mode | All lights on | All lights on for 10s | X | |
| | Symbol light temporary mode | H/L | H/L OFF | O | |
| Symbol light button | Symbol light on mode | All lights off | – | X | H/L not |
| | Symbol light off mode | All lights on & H/L | H/L OFF | X | |
| | Symbol light temporary mode | All lights off | – | X | H/L not |
| Call button | Symbol light on mode | H/L | H/L OFF | O | |
| | Symbol light off mode | All lights on | All lights on for 10s | X | |
| | Symbol light temporary mode | H/L | H/L OFF | O | |
| Phone button | Symbol light on mode | H/L | H/L OFF | O | |
| | Symbol light off mode | All lights on | 10s All lights on | X | |
| | Symbol light temporary mode | H/L | H/L OFF | O | |
| SOS button | Symbol light off mode | H/L | Lights on at not highlight brightness but general light brightness for 10s (SOS Only) | O | HL, low-light for 10s |
| | Symbol light temporary mode | H/L | H/L OFF | O | |

● H/L : High-Light
● 10s All lights on : Control in symbol light temporary on mode

METHOD OF CONTROLLING BUTTON SYMBOL OF INSIDE MIRROR

CROSS-REFERENCE TO RELATED APPLICATION

The present application claims priority of Korean Patent Application Number 10-2014-0062384 filed on May 23, 2014, the entire contents of which application are incorporated herein for all purposes by this reference.

BACKGROUND OF INVENTION

Field of Invention

The present invention relates to a method of controlling a button symbol of an inside mirror. More particularly, it relates to a method of controlling a button symbol of an inside mirror which is capable of solving visual interference due to the glare of a symbol light during night driving while increasing visibility of a button location, button operability, and daytime and night visibility of the button symbol in a frameless inside mirror.

Description of Related Art

In general, an inside mirror of a vehicle, which is installed on an upper end of a windshield between a driver seat and a passenger seat, is used to secure a rear view. Recently, as vehicles have gotten more luxurious, various functions and device modules for convenience have been embedded in the inside mirror beyond a simple mirror function.

Representative functional devices include an ECM (Electronic Chromic Mirror) that automatically adjusts reflection of light from the mirror to prevent a driver from being dazzled by the headlights from other vehicles, an ETCS (Electronic Toll Collection System) that automatically collects tolls at the tollgate of an expressway, and as display function that displays various kinds of information.

In addition, there is a home link system for closing/opening the garage door of a house, which is applied to a vehicle in North America.

The related arts to the inside mirror for a vehicle described above are disclosed in Korean Unexamined Patent Publication No. 2011-0078721 (Jul. 7, 2011), Korean Unexamined Patent Publication No. 2010-0123435 (Nov. 24, 2010), Korean Unexamined Patent Publication No. 2005-0120022 (Dec. 22, 2005) and Japanese Unexamined Patent Publication No. 2002-264726 (Sep. 18, 2002).

Meanwhile, the inside mirror includes operation buttons which are operated by a driver to allow several convenience devices as well as the above described convenience device to be operated.

The operation buttons installed to the inside mirror include buttons related to ETCS, telematics and a home link system, and in addition, the operation buttons include an operation button related to an ECM function (ECM power button).

Figure 1:
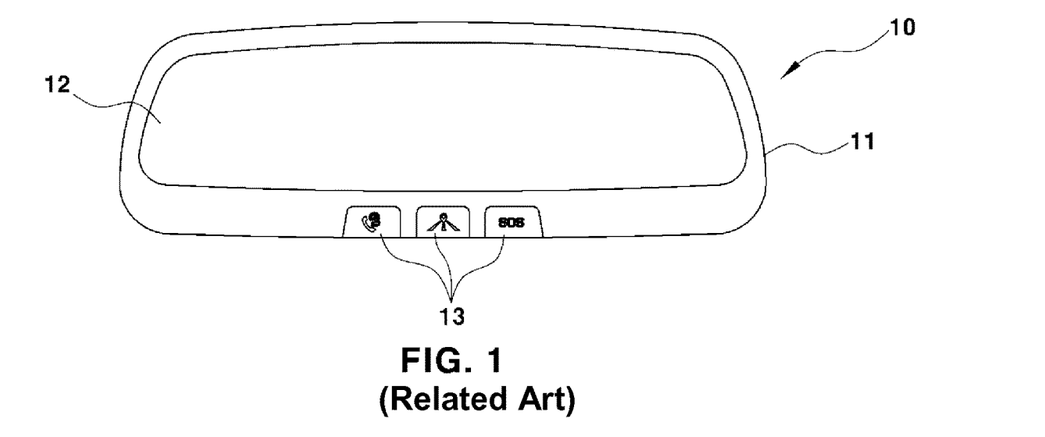
FIG. 1 is a front view showing a conventional inside mirror having operation buttons.

FIG. 1 is a front view showing a conventional inside mirror having operation buttons, where reference number 12 denotes a mirror glass of the inside mirror 10. As shown in FIG. 1, when the inside mirror is seen from the front thereof, a plurality of operation buttons 13, on which symbols are denoted, is installed on a front low end of a mirror housing 11 constituting a rim of a mirror. Lighting means for lighting the symbols may be embedded in the operation buttons 13.

In case of the mirror shown in FIG. 1, a rim (which is a frame formed by a mirror housing) of the mirror 10 has a large width. Specifically, since a portion of the rim, in which the operation buttons 13 are installed, has a very large width, the sight area of the mirror for securing a rear view is reduced as much as it.

Figure 2A:
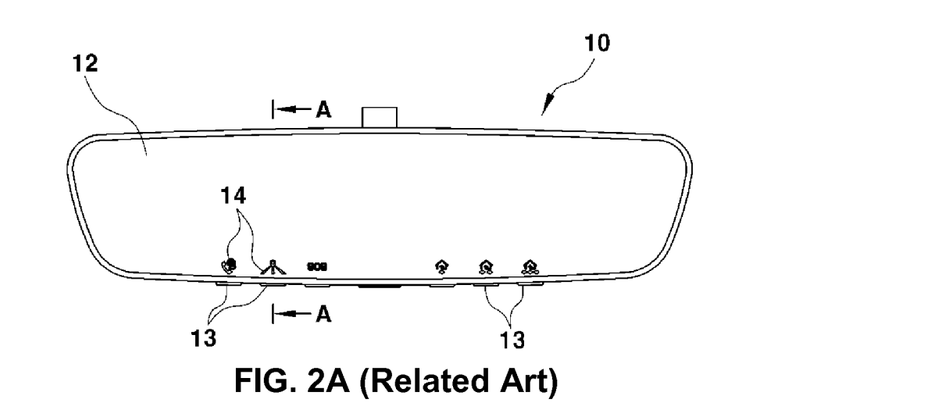
FIGS. 2A and 2B are views showing a frameless inside mirror.
Figure 2B:
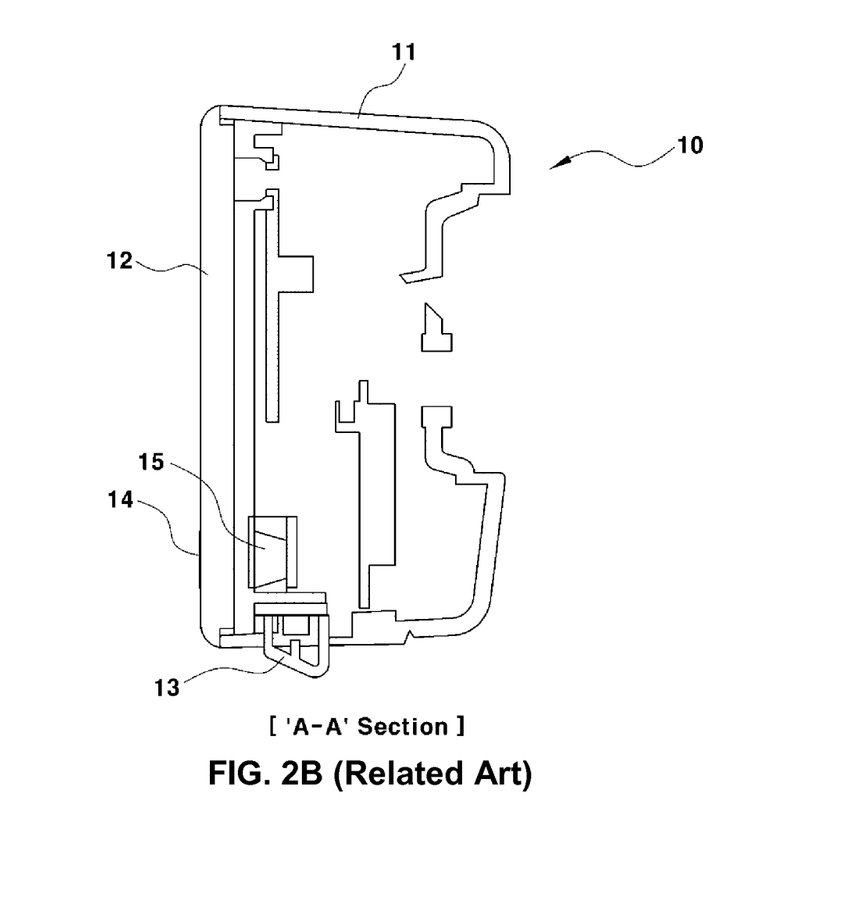

To improve the above, there has been developed and applied a frameless inside mirror. FIGS. 2A and 2B are views showing a frameless inside mirror. As shown in FIGS. 2A and 2B, according to the frameless inside mirror 10, a mirror front surface is finished only with a mirror glass 12 so that a rim having a large width formed by the mirror housing 11 does not exist, and the operation buttons 13 are arranged in a lower portion of the mirror housing 11.

In case of the frameless inside mirror 10, since the mirror front surface is finished only with a mirror glass 12, so that it is difficult to install the operation buttons 13 on the mirror front surface, the operation buttons 13 are arranged in a lower portion of the mirror housing 11.

However, in this case, it is difficult for a driver to find out a desired button for operation. To solve the above problem, as shown in FIGS. 2A and 2B, symbols (or, referred to as 'icons') 14 for denoting each position of the operation buttons 13 are additionally arranged on a lower end of the front surface of the mirror glass 12.

However, a light means including an LED 15 is installed at the inside of the mirror glass 12 in the rear of the symbols such that the symbols are lighted to be displayed. When the button symbol 14 is placed on the surface of the mirror glass 12, due to the glare of the symbol light (which is always turned on) during nighttime, the sight of a driver is interrupted. That is, when a driver confirms a rear object through a mirror, the symbol light is first seen, so that the security of sight is interrupted.

In addition, operation buttons of a touch screen type are installed on a low end of a front surface of a mirror glass. In this case, since a touch screen portion is always placed on a lower end portion of the mirror, a sight surface area of the mirror is reduced as large as that of the touch screen.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Accordingly, the present invention has been made in an effort to solve the above-mentioned and/or other problems, and the present invention is to provide a method of controlling a button symbol of an inside mirror, which is capable of allowing a driver to easily find out the location of an operation button by lighting each symbol of operation buttons of a frameless inside mirror, and more particularly, of solving visual interference due to the glare of a symbol light during nighttime driving while increasing visibility of a button location, button operability, and daytime and night visibility of the button symbols.

In various aspects, there is provided a method of controlling lights of symbols for a frameless inside mirror, wherein the frameless inside mirror includes operation buttons for operating predetermined functions, mirror glass symbols for denoting locations of the operation buttons and lighting means for individually lighting the symbols, the operation buttons include a symbol light button and an SOS button for requesting emergency relief, and lights are controlled according to a selected symbol light mode. The method may include: turning on all of the lights for the symbols in a symbol light on mode when an operation of pushing a symbol light button is recognized in a symbol light off mode; turning off all of the lights for the symbols in the symbol light off mode when an operation of pushing the symbol light button is recognized in the symbol light on mode; and turning on all of the lights for the symbols for a predetermined time period in a symbol light temporary on mode when an operation of pushing any other operation symbol or symbols except those for the symbol light button and the SOS button is recognized in the symbol light off mode.

As described above, according to the method of controlling a button symbol of an inside mirror of the present invention, a symbol of each operation button of a frameless inside mirror is lighted, so that a driver may easily find out the location of an operation button. Particularly, visual interference due to the glare of a symbol light during nighttime driving may be prevented while visibility of the location of a specific button, button operability, and visibility of the button symbols during daytime and nighttime are improved.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 3A:
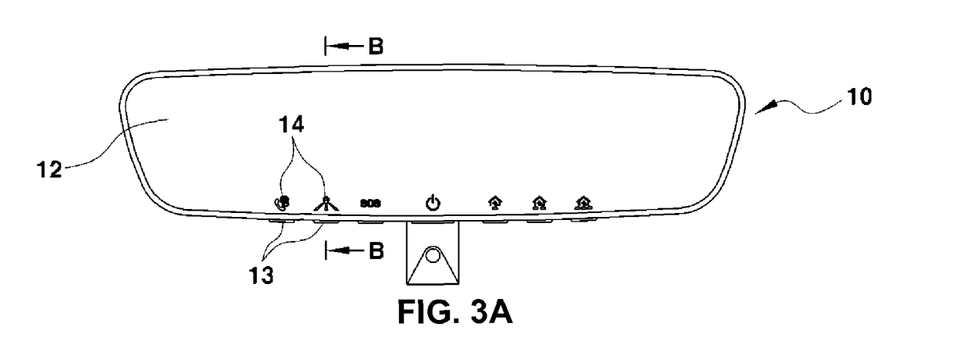
FIGS. 3A and 3B are views showing an example of a frameless inside mirror to which the present invention is applied.
Figure 3B:
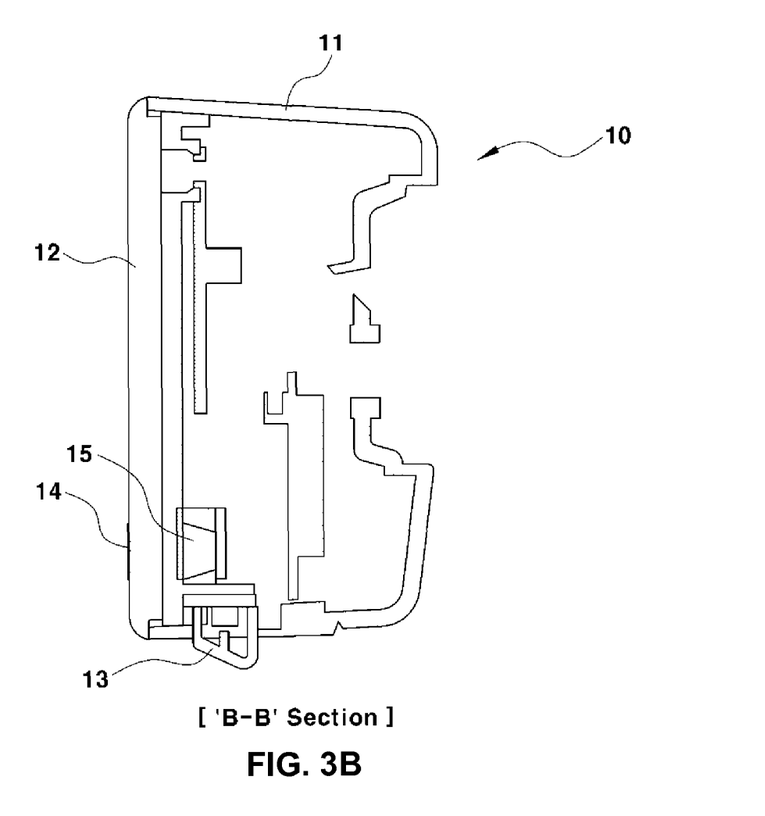
Figure 4A:
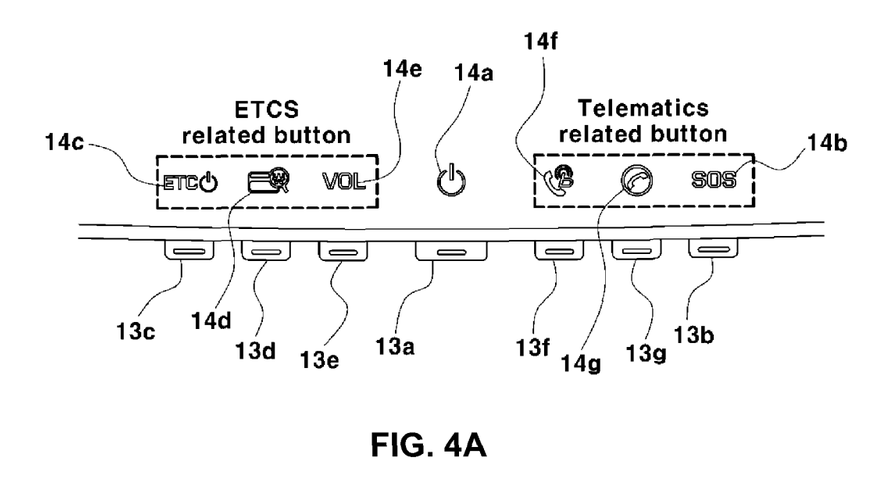
FIGS. 4A and 4B are views showing examples of buttons and symbols of a frameless inside mirror to which the present invention is applied.
Figure 4B:
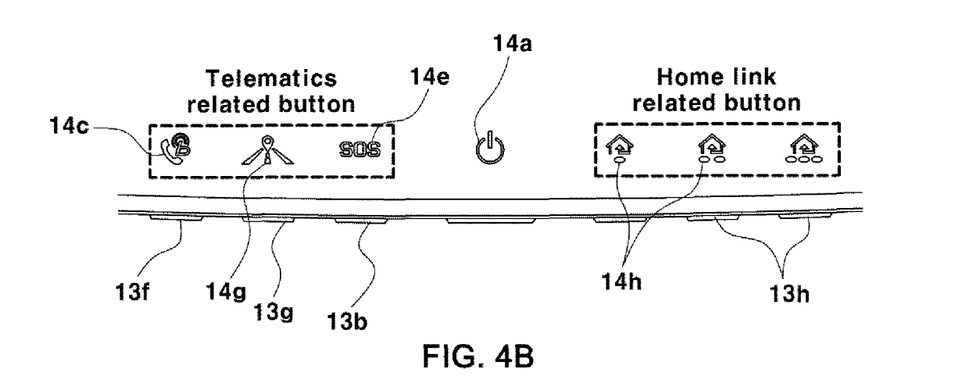

FIGS. 3A and 3B are views showing an example of a frameless inside mirror to which the present invention is applied. FIGS. 4A and 4B are views showing examples of buttons and symbols of a frameless inside mirror to which the present invention is applied. As shown in the drawings, an inside mirror 10 to which the present invention is applied is an frameless inside mirror, in which a front of a mirror is finished only with a mirror glass 12 without a rim having a large width formed by a mirror housing 11 and operation buttons 13 are arranged at a low portion of the mirror housing 11.

In addition, symbols 14 for informing of locations of each operation buttons 13 are arranged on a front of a low end of the mirror glass. A lighting means including LEDs 15 for lighting symbol portions is installed at an inside of the mirror glass 12 in the rear of the symbol portions such that the symbols are lighted.

Figure 5:
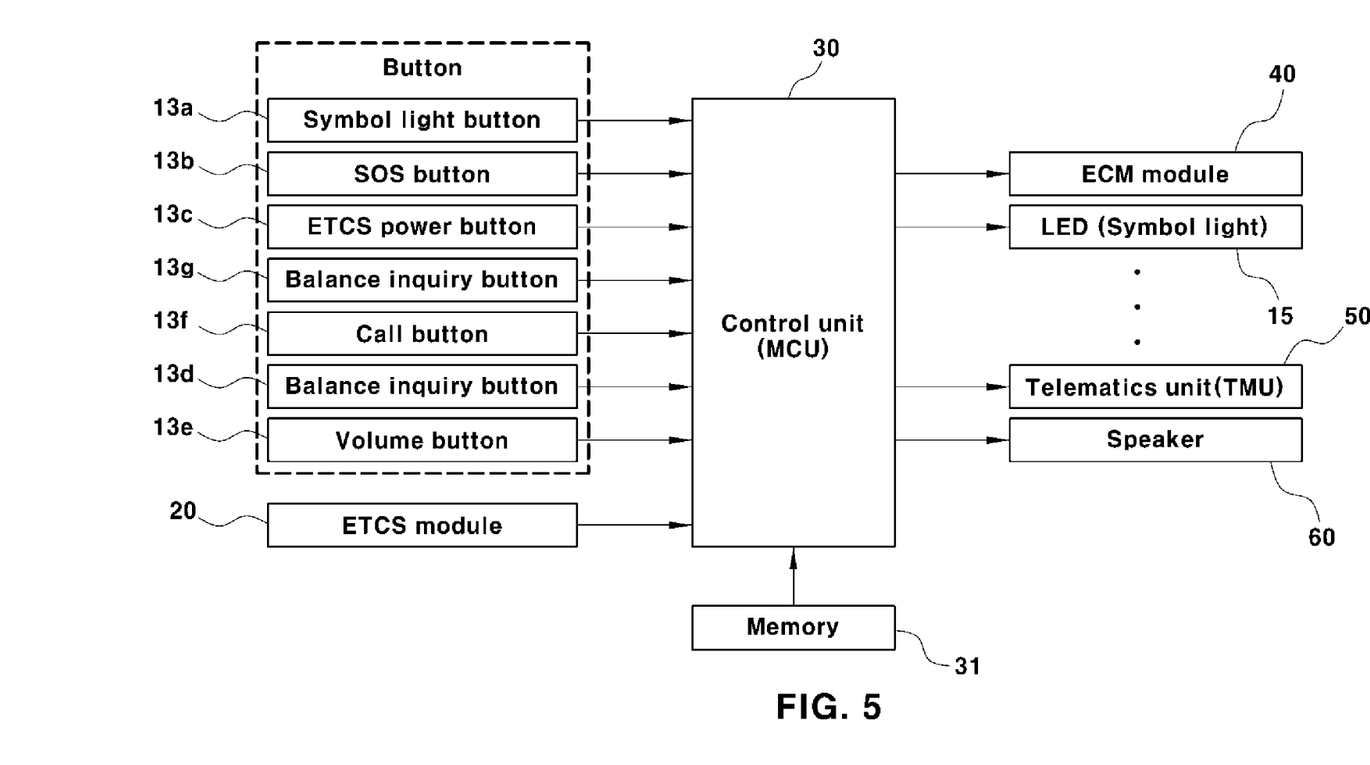
FIG. 5 is a block diagram showing a configuration of an inside mirror module to which the present invention is applied.

As describe below, each LED 15 is turned on or off by a control unit (e.g., reference numeral 30 of FIG. 5). In case that the LED 15 is turned on, the LED 15 is controlled to be in either a low-light state or a high-light state by the controller 30, where the LED 15 emits light having predetermined conventional brightness in the low-light state and the LED 15 emits light brighter than that of the low-light state.

The symbols 14 for each operation button 13 are utilized when a driver finds out the locations of the buttons 13 during daytime. Specifically, during nighttime, the symbols allow the button locations to be more easily found out at a dark place through a light.

Referring to FIG. 4(A), a symbol light button 13a, which is one among the operation buttons provided on the lower portion of the mirror housing of the inside mirror, is operated to allow the symbol light to be turned on or off. The symbol light button 13a is used to allow the LEDs (e.g., reference numeral 15 of FIGS. 3A and 3B) for lighting all of the symbols (e.g., reference numeral 14 of FIGS. 3A and 3B, reference numerals 14a~14h of FIGS. 4A and 4B) to be turned on or off in a lump.

In addition, operation buttons related to telematics and ETCS are provided to a vehicle in which the TMU (Telematics Unit) and the ETCS are installed.

The operation buttons related to telematics may include a call button 13f operated to call a telematics center (in order to communicate with a tele-communicator through a mobile communication network) for the purpose of receiving a telematics service (such as a navigation service), a phone button 13g operated to use a conventional wireless telephone, and an SOS button 13b operated to request emergency relief.

In addition, the operation buttons related to ETCS may include an ETCS power button 13c for turning on or off the ETCS, a balance inquiry button 13d for inquiring balance, and a volume button 13e for controlling the volume of an ETCS speaker.

In addition, a button for selectively operating an ECM module embedded in the inside mirror 10, that is, an ECM power button for turning on or off the ECM may be provided.

As shown in FIG. 4B, a vehicle released in North America may include operation buttons related to the telematics and operation buttons 13h related to a home link system, that is, buttons for opening or closing a garage door.

In addition, the symbols 14a to 14h, which correspond to the operation buttons 13a to 13h and indicate the locations of the operation buttons 13a to 13h, are arranged on the surface of the mirror glass (e.g., reference numeral 12 of FIGS. 3A and 3B).

The operation buttons and symbols describe above are proposed as one example of a frameless inside mirror to which the present invention is applied. The kinds of operation buttons and the symbols may be variously changed and added thereto, but the present invention is not limited to the operation buttons and the symbols proposed in FIGS. 4A and 4B.

Meanwhile, hereinafter, a method of controlling button symbols according to the present invention will be described.

The present invention relates to a method of controlling a symbol light in connection with a button operation. FIG. 5 is a block diagram showing a configuration of an inside mirror module to which the present invention is applied. As shown in FIG. 5, the inside mirror module may include a symbol light button 13a, an SOS button 13b, an ETCS power button 13c, a phone button 13g, a call button 13f, a balance inquiry button 13d and a volume button 13e. In addition, the inside mirror module may include an ETCS module 20, an ECM module 40 and a memory 31 for storing various kinds of information.

The ETCS module 20 is a module in which functions for ETCS (Electronic Toll Collection System) are unified. The ETCS module 20 may include an ETCS antenna and a user information interface for providing an interface for collecting a toll, such as a card socket.

In addition, a speaker 60 for outputting information generated from the ETCS module 20 as a voice to an outside may be provided. The ECM module 40 may include various kinds of sensors (such as a photosensitive sensor) and a circuit in order to drive the ECM. In addition, the lighting means for lighting the symbols, that is, LEDs 15 are provided.

In addition, a telematics unit 50, which interworks with the operations of the operation buttons related to the telematics, such as the SOS button 13b, the calling button 13f and a phone button 13g, to perform a function of providing a telematics service, is installed in a vehicle. A control unit 30 recognizes states of the buttons through manipulation of a driver and transfers the states of the buttons to the ETCS module 20, the ECM module 40 and the telematics unit 50.

Next, since the operation buttons 13 and 13a to 13h are arrange adjacently to each other in the inside mirror 10 according to the present invention, an order of priority is preset to the buttons by taking into consideration the fact that two buttons may be pushed by a driver at the same time.

In this case, the priority order of the buttons may be predetermined into the following order of: ① the SOS button 13b, ② the symbol light button (ISO Button) 13a, ③ the ETCS power button 13c and ④ the other buttons 13d to 13h.

Since the priority order is preset into the control unit 30, when buttons having mutually different priorities are simultaneously pushed, the control unit 30 recognizes only the pushing operation of one button that is ahead of the other button in priority.

In addition, the control unit 30 recognizes the states of whether each of the buttons is pushed or released by a driver according to logic. Basically, when a specific button is pushed for a predetermined time period, the control unit 30 recognizes that the button state (button mode) is in a push mode. When the pushing operation of the specific button is released for a predetermined time period or over, the controller 30 recognizes that the button state is in a release mode.

Figure 6:
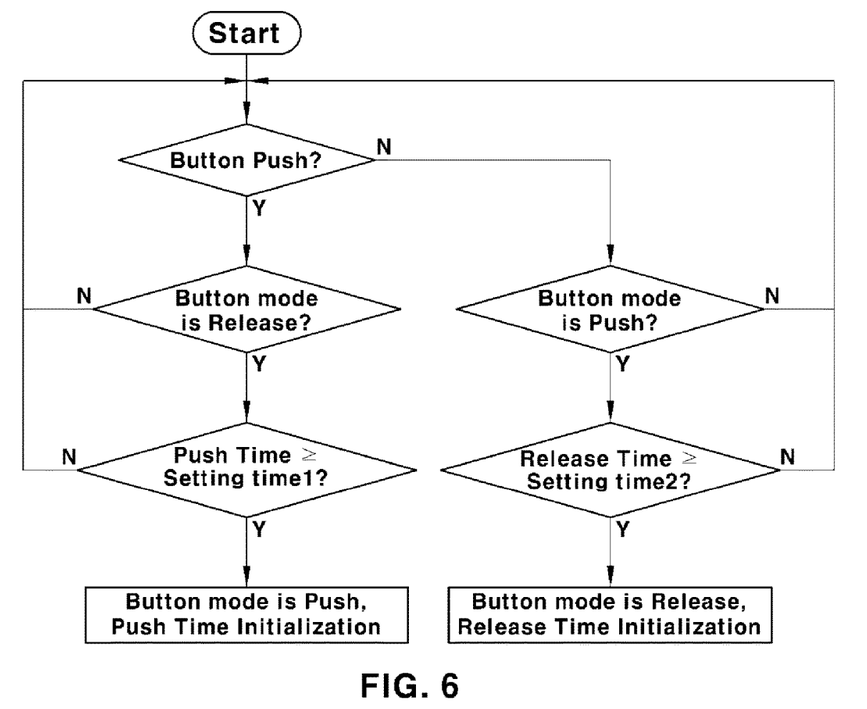
FIG. 6 is a flowchart showing a method of recognizing push and release modes of a button according to the present invention.

Referring to FIG. 6, time is counted while a button is pushed (a button timer in the logic of the control unit is operated). Then, when the previous button mode is a release mode and the button is continuously pushed for set time 1 (for example, 50 ms) or over (Push Time≥Set time 1, where the 'Push Time' is a time taken to maintain the state that the button is pushed), the state of the button is recognized as a push mode.

In addition, when a driver releases the pushing operation of the button (Button Release), the timer is reset to restart counting. Then, when the previous button mode is a push mode and the push release state of the button is continuously maintained for set time 2 (for example, 200 ms) or over (Push Time≥Set time 2, where the 'Push Time' is a time taken to maintain the push release state of the button), the state of the button is recognized as a release mode.

Of course, when the push state of the corresponding button is maintained for less than set time 1 or the push releasing state of the corresponding button is maintained for less than set time 2, the switching and recognition of the button mode are not performed. In addition, when the button mode is switched, the counted time (Push time/Release time) is reset.

As described above, when a driver pushes a button for the predetermined time period, the control unit 30 recognizes the button state as the push mode. When a driver gets the button off his hands for the predetermined time period to release the push state of the button, the control unit 30 recognizes the button state as the release mode.

In addition, if plural buttons having mutually different priorities are simultaneously manipulated in the push condition (pushed for set time 1 or over), as described above, the control unit recognize the state of the button having the highest priority as the push mode and recognizes the states of the other buttons having lower priorities as the release mode.

In short, the control unit recognizes the operation of the button having the highest priority and ignores the operations of the other buttons having lower priorities, so that the control unit controls such that the function corresponding to the operation of the button having the highest priority is performed.

That is, the control unit 30 transfers the button state which is recognized as the push mode to a corresponding device (the ETC module, the telematics unit, the home link system or the ECM module), such that the function corresponding to the operation of the corresponding button is performed.

Meanwhile, the control unit controls the symbol lights according to the button operation state. The symbol light mode according to the present invention is classified into three modes including a symbol light on mode, a symbol light off mode, and a symbol light temporary on mode.

Figure 7:
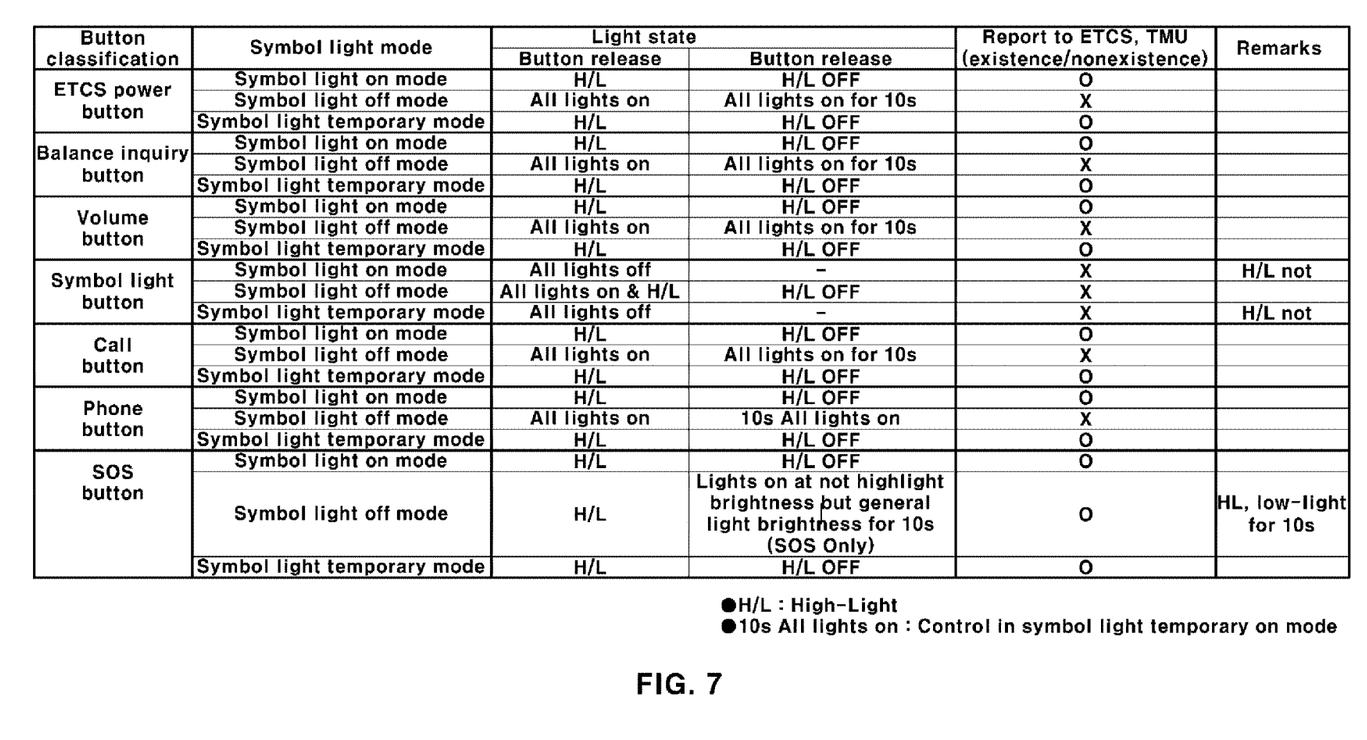
FIG. 7 is a chart showing light control states when each button is manipulated in three symbol light modes according to the present invention.

As an example, FIG. 7 is a chart showing light control states when each button is manipulated in three symbol light modes.

The symbol light on mode is a mode in which the lights of all symbols 14a to 14h are turned on (all LEDs 15 are tuned on). When an arbitrary button among all operation buttons (except for the SOS button 13b) including the symbol light button is pushed in the state that the symbol lights are turned off so that the control unit 30 recognizes a push mode of an arbitrary button 13a and 13c to 13h, the LEDs 15 of all symbols 14a to 14h are basically turned on at general brightness (Low-light).

In this case, when the symbol light button 13a is manipulated in the state that the symbol lights are turned off, the mode is switched into the symbol light on mode so that all of the symbol lights are turned on. However, when the buttons 13c to 13h except for the symbol light button 13a and the SOS button 13b are manipulated, the mode is switched into the symbol light temporary on mode that will be described below.

In addition, in order to improve the driver sight interruption due to the symbol light during nighttime, when the button manipulation is unnecessary in the symbol light on mode, so that the symbol light button 13a is additionally manipulated so that the control unit 30 recognizes the push mode of the symbol light button 13a in the symbol light on mode, the mode is switched into the symbol light off mode that will be described below, so that the LEDs 15 of all symbols 14a to 14h are turned off (lights out).

In addition, when a driver pushes a function button 13c to 13h except for the SOS button 13b having the highest priority and the symbol light button 13a in the symbol light on mode, so that the control unit recognizes the push mode of the function button 13c to 13h, the corresponding function is allowed to be performed (to transfer a button state signal to the corresponding device) and the symbol 14c to 14h corresponding to the function button is only highlighted while the driver pushes the function button 13c to 13h in the state that the symbol on mode is maintained.

In this case, the high light signifies that the light brightness of a corresponding symbol is increased greater than the predetermined general light brightness (low light brightness) such that the corresponding symbol is emphasized (the corresponding symbol is lighted brighter than any other symbols).

In addition, when a driver pushes the SOS button 13b having the highest priority in the symbol light on mode so that the control unit 30 recognizes the push mode of the SOS button 13b, the SOS function (emergency relief request function) is performed (the SOS button state signal is transferred to the telematics unit), and only the SOS button symbol 14b may be highlighted while the SOS button 13b is pushed and the symbol light on mode is maintained.

In this case, the LEDs 15 are turned on to low-light the symbols 14a and 14c to 14h of the other buttons 13a and 13c to 13h except for the SOS button 13b (at the general light brightness).

Of course, when there are no longer button manipulations in the symbol light on mode, the symbol light on mode, in which all symbols are low-lighted, is continuously maintained.

If necessary, the driver simply pushes the symbol light button 13a so that it can be maintained that the symbols 14a to 14h of all the buttons 13a to 13h are lighted (all the symbol lights may be turned on).

The symbol light off mode is a mode in which the lights of all symbols 14a to 14h are turned off (lighted off). When a driver manipulates the symbol light button 13a in the symbol light off mode, so that the control unit 30 recognizes the push mode of the symbol light button 13a, the mode is switched into the symbol light on mode such that all symbols 14a to 14h are turned on (lighted on).

In addition, when a driver pushes any other buttons 13c to 13h except for the SOS button having the highest priority and the symbol light button 13a in the symbol light off mode, so that the control unit 30 recognizes the push mode of the function buttons 13c to 13h, the mode is switched into the symbol light temporary on mode which will be described below. In this case, while the function buttons 13c to 13h are pushed, the high light of the symbol of the corresponding function button is not performed.

In addition, when a driver pushes the SOS button 13b having the highest priority so that the control unit 30 recognizes the push mode of the SOS button 13b, the SOS function (emergency relief request function) may be immediately performed and the SOS button symbol 14b may be highlighted while the SOS button 13b is pushed and the symbol light off mode is maintained. That is, only the symbol 14b of the SOS button 13b is highlighted and the symbols of the other buttons are maintained in a turn-off state.

Of course, when there are no longer button manipulations in the symbol light off mode, the symbol light off mode is continuously maintained, so that the sight of a driver is prevented from being interrupted due to the unnecessary symbol light.

Next, the symbol light temporary on mode is a mode in which it is kept to cause an additional manipulation of the function buttons 13c to 13h while the lights of all symbols 14a to 14h are primarily turned on for the predetermined time when the function buttons 13c to 13h except for the SOS button 13b and the symbol light button 13a are pushed in the symbol light off mode. In the symbol light temporary on mode, when a function button 13c to 13h is manipulated, the corresponding function is performed.

That is, when the control unit 30 recognizes the push mode of any other function button 13c to 13h in the symbol light off mode, all symbol lights 14a to 14h are temporarily turned on for set time 3 (for example, 10 s). Then, time is counted after a function button is lastly manipulated and the mode is automatically switched into the symbol light off mode when the set time 3 is elapsed.

When a driver pushes the symbol light button 13a in the symbol light temporary on mode, so that the control unit 30 recognizes the push mode of the symbol light button 13a in the symbol light temporary on mode, the mode is switched into the symbol light off mode, so that the LEDs 15 of all symbols 14a to 14h are turned off (light off).

In addition, when a driver pushes any other function button 13c to 13h except for the SOS button 13b having the highest priority and the symbol light button 13a in the symbol light temporary on mode, so that the control unit 30 recognizes the push mode of the function button 13c to 13h, the corresponding function is performed. Then, the timer is reset and the symbol of the function button is highlighted while the driver pushes the function button 13c to 13h in the state that the symbol light temporary on mode is maintained.

In addition, when a driver pushes the SOS button 13b having the highest priority in the symbol light temporary on mode so that the control unit 30 recognizes the push mode of the SOS button 13b, the SOS function (emergency relief request function) is performed and the timer is reset. Then, only the SOS button symbol 14b is highlighted for set time 3 after the timer is reset while the SOS button 13b is pushed and the symbol light temporary on mode is maintained.

As described above, when the symbol light button 13a is pushed in the symbol light on mode and the symbol light temporary on mode, the mode is switched into the symbol light off mode in which the lights of all symbols 14a to 14h are turned off (all LEDs 15 are turned off). Thus, when it is unnecessary to manipulate the buttons, a driver pushes the symbol light button 13a such that all symbol lights may be turned off. Therefore, the sight of a driver may be prevented from being interrupted due to the unnecessary symbol lights while driving.

In addition, when a driver pushes any other button to find out a desired button in state that the symbol lights are turned off, the mode is switched into the symbol light on mode (in case that the symbol light button is pushed) or the symbol light temporary on mode (in case that any other function button except for the symbol light button and the SOS button is pushed) in which all symbol lights are turned on. Thus, since the lights of all symbols are turned on during nighttime, it is easy for a driver to find out a desired button.

Only, similarly to the symbol light on mode and the symbol light temporary on mode, when a driver manipulates the SOS button 13b in an emergency situation even in the symbol light off state, while the SOS function is immediately performed, the SOS button symbol 14b is highlighted.

When the SOS button 13b is manipulated in the symbol light off mode, the symbol 14b of the SOS button is only highlighted while the SOS button 13b is pushed, and the symbols 14a, 14c to 14h of the other buttons 13a and 13c to 13h are maintained in the turn-off state.

When one of the function buttons 13c to 13h related to the ETCS, the telematics and the home link except for the symbol light button 13a and the SOS button 13b is manipulated in the symbol light off mode, the mode is primarily switched into the symbol light temporary on mode without performing the function of the corresponding button. Thereafter, when a desired function button is pushed in the symbol light temporary on mode, the corresponding function is performed. However, in case of the SOS button 13b for emergency, when the push mode is recognized, the SOS function is immediately performed.

In addition, when the SOS button 13b and the function buttons 13c to 13h except for the symbol light button 13a are pushed in the symbol light on mode, the symbols 14b to 14h of the corresponding buttons are highlighted and the corresponding functions are immediately performed. In addition, the symbol light on mode is continuously maintained. That is, all LEDs for the symbols of the buttons except for the pushed button are maintained in the turn-on state in the low light mode.

In addition, when a vehicle ignition is switched off, the previous symbol light mode is memorized in a memory. Thereafter, when the vehicle ignition is switched on, the lights are controlled in the previous symbol light mode.

As described above, when the control unit 30 recognizes the push mode of the SOS button 13b, the SOS function is performed. Thus, the control unit 30 informs the telematics unit 50 of the fact that the push mode of the SOS button 13b is recognized, such that the function of requesting emergency relief is performed.

Of course, even in case of any other function button such as the ETCS power button 13c, the balance inquiry button 13d, the volume button 13e, the phone button 13g or the call button 13f, the control unit 30 informs the ETCS module 20 or the telematics unit 50 of the fact that the push mode of the corresponding button is recognized, such that the corresponding function is performed.

Figure 8:
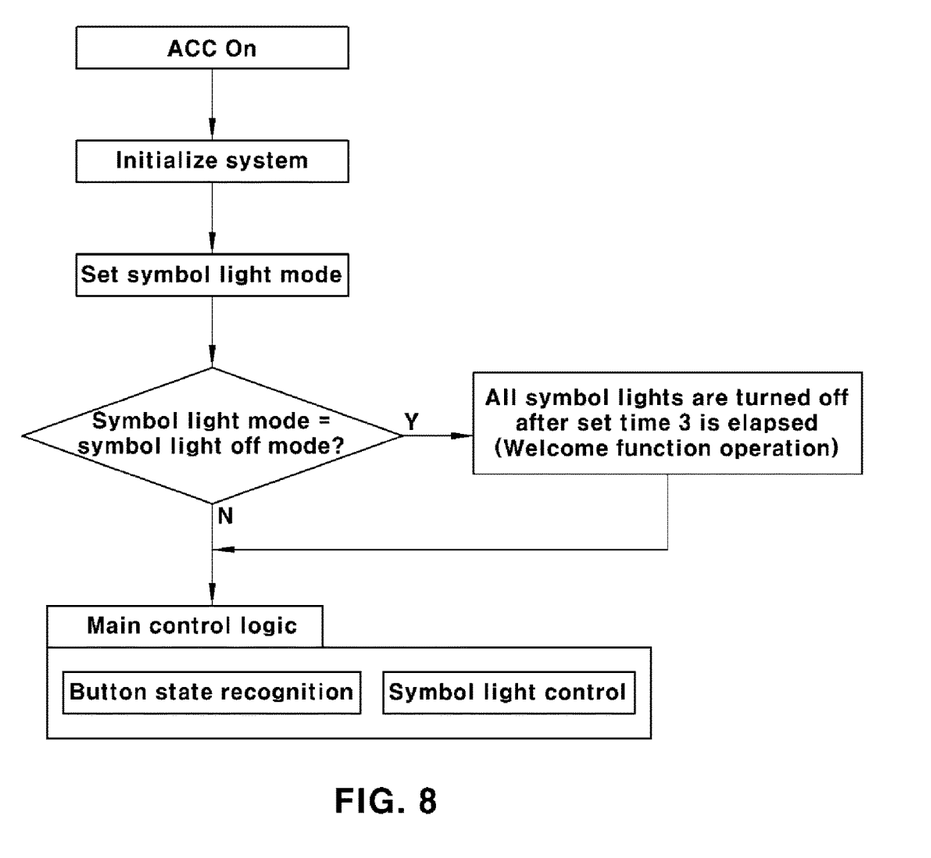
FIG. 8 is a flowchart showing a procedure until the main control logic for controlling symbol lights is executed when the vehicle ignition starts according to the present invention.

FIG. 8 is a flowchart showing a process until the main control logic for controlling symbol lights is executed when the vehicle ignition starts. When a driver locates an ignition key at an ACC-On position in order to ignite a vehicle, the symbol light mode is set through a system initializing process.

In this case, the mode is set into the symbol light mode which is memorized when the vehicle is stopped (ignition is off). If the memorized previous mode is the symbol light off mode when the ignition key is located at an ACC-On position, the control unit 30 performs the welcome function of simultaneously turning on the symbols 14a to 14h of all the buttons 13a to 13h for predetermined set time 4 (for example, 3 seconds). That is, even though the mode memorized when the ignition is switched on is the symbol light off mode, all symbol lights are turned on for set time 4 and are turned off after set time 4.

After the welcome function is performed, the main control logic is immediately executed.

In addition, when the previously memorized symbol light mode is not the symbol light off mode, that is, the previous mode memorized when the ignition key is located at the ACC-On position is the symbol light on mode in which all symbol lights are turned on, the main control logic is immediately executed.

According to the main control logic, when the driver manipulates a button 13a to 13h, the control unit 30 recognizes the button state (determines the push mode/release mode of each button) and performs the light control for the button symbols 14a to 14h according to the logic described above.

Figure 9:
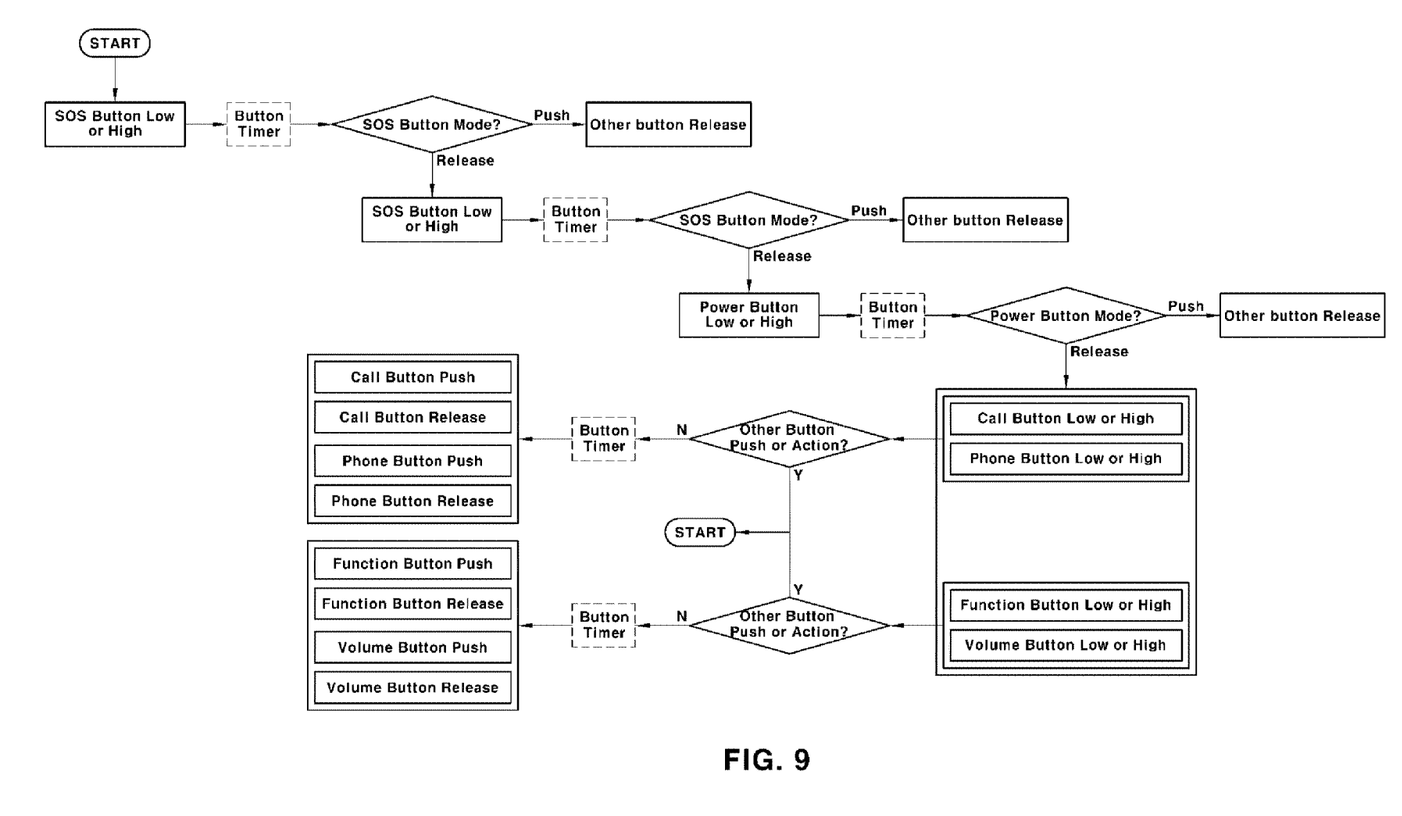
FIG. 9 is a flowchart showing a process of recognizing a button state (button mode) by the main control logic according to the present invention.

FIG. 9 is a flowchart showing a process of recognizing a button state (button mode) by the main control logic, where a process of recognizing a button manipulating state according to the predetermined priority order when the driver pushes plural buttons adjacent to each other at the same time is shown.

Basically, when one button is pushed so that the push mode of the button is recognized, the control unit 30 informs the corresponding apparatus (such as the ETCS module, the telematics unit, the home link system or the ECM module) of the fact that the corresponding button is pushed such that the function may be operated according to the manipulation of the button.

Hereinafter, when plural buttons are simultaneously pushed, the process of recognizing a button manipulation state will be described with reference to FIG. 9. First, when the SOS button 13b having the highest priority and any other buttons are simultaneously pushed so that the push mode of the SOS button 13b is recognized through the recognizing process of FIG. 6, even though the buttons are pushed simultaneously with the SOS button, the pushing operations of the buttons are recognized as the release mode. That is, it is recognized that the buttons having lower priorities are not pushed and the SOS function is only performed.

While the SOS button 13b is pushed, the symbol 14b of the SOS button is highlighted.

In addition, when the symbol light (ISO) button 13a exists in the buttons simultaneously pushed in state that the SOS button is not pushed, the pushing operation of the symbol light button 13*a* having the highest priority is recognized as the push mode and the operations of the other buttons are recognized as the release mode through the process (button timer) of FIG. 6.

In this case, since the symbol light button 13*a* is pushed so that the push mode is recognized, the function according to the manipulation of the symbol light button is performed. In addition, the symbol 14*a* of the symbol light button is highlighted while the symbol light button is pushed by a driver.

That is, when the symbol light button 13*a* is pushed and the symbol light mode is the symbol light on mode, the mode is switched into the symbol light off mode so that all the symbol lights are turned off (all LEDs are turned off). To the contrary, when the symbol light mode is the symbol light off mode, all the symbol lights are turned on (all LEDs are turned on).

In addition, when the symbol light mode is the symbol light temporary on mode, the mode is switched into the symbol light off mode so that all symbol lights are turned off.

In addition, when the ETSC power button 13*c* exists in the buttons simultaneously pushed in state that the SOS button 13*b* and the ISO button 13*a* are not pushed, the pushing operation of the ETCS power button 13*c* having the higher priority is recognized as the push mode and the operations of the other buttons are recognized as the release mode through the process of FIG. 6.

In this case, since the ETCS power button 13*c* is pushed so that the push mode is recognized, the function according to the manipulation of the ETCS power button is performed. In addition, the symbol 14*c* of the ETCS power button is highlighted while the ETSC power button is pushed by a driver.

In addition, when, in state that the SOS button, the symbol light button and the ETSC power button having relatively higher priorities are not pushed, plural buttons having the same priority are simultaneously pushed, the pushing operation of the function buttons are ignored and the process returns to the start step.

Only, when the function buttons are simultaneously pushed in the symbol light off mode, since this case is in a state that the buttons are pushed, similarly to the symbol light temporary mode, after all symbol lights are turned on for set time 3 in order to easily find out the button desired by a driver, all symbol lights are turned off again so that the symbol light off mode is maintained (in this case, the symbols are not high-lighted while the buttons are pushed).

In addition, when a function button is pushed in state that another button is first pushed, or another function button (such as the SOS button, the symbol light button or ETCS power button) is pushed in a button action state that one of the function buttons is recognized as the push mode so that the function of the button is operated, the later manipulation of the function button is ignored and the process returns to the start step.

The action state of a specific button signifies the state that, while a function of the specific button is operated after the mode of the specific button is recognized as the push mode, the pushing state of the specific button is released (push is released) or that another button having the higher priority is waited to be pushed (pushing operation).

Of course, when another button having higher priority is pushed in the button action state so that the push mode is recognized, the function of the button having higher priority is performed.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of controlling lights of symbols for a frameless inside mirror, wherein the frameless inside mirror includes operation buttons for operating predetermined functions, mirror glass symbols for denoting locations of the operation buttons and lighting devices for individually lighting the symbols, the operation buttons include a symbol light button and an SOS button for requesting emergency relief, and the lighting devices are controlled according to a selected symbol light mode, the method comprising: turning on all of the lighting devices for the symbols in a symbol light on mode when an operation of pushing a symbol light button is recognized in a symbol light off mode; turning off all of the lighting devices for the symbols in the symbol light off mode when an operation of pushing the symbol light button is recognized in the symbol light on mode; and turning on all of the lighting devices for the symbols for a predetermined time period in a symbol light temporary on mode when an operation of pushing any other operation symbol or symbols except those for the symbol light button and the SOS button is recognized in the symbol light off mode, wherein, when a pushing manipulation of another operation button except those for the symbol light button and the SOS button is recognized in the symbol light temporary on mode, performing the pushing manipulation of the another operation button and maintaining the symbol light temporary on mode for the predetermined time period, and wherein, after the lighting devices of all the symbols are turned on for the predetermined time period in the symbol light temporary on mode, switching the symbol light temporary on mode into the symbol light off mode wherein priorities of the operation buttons of the frameless inside mirror are preset, and when adjacent operation buttons having mutually different priorities are simultaneously pushed, only a push manipulation of a button having a highest priority is recognized.

2. The method of claim 1, wherein when the operation of pushing any other operation symbol or symbols except those for the symbol light button and the SOS button is recognized in the symbol light on mode, the method further comprising: performing the operation of pushing the any other operation symbol or symbols except those for the symbol light button and the SOS button; and maintaining the symbol light on mode.

3. The method of claim 2, further comprising: performing a high light operation so that a symbol of an operation button being pushed is lighted brighter than symbols of other operation buttons that are not pushed.

4. The method of claim 1, wherein, when a push manipulation of the SOS button is recognized in the symbol light mode, the method further comprising: performing requesting emergency relief, and performing a high light operation so that a symbol of the SOS button is high-lighted and is lighten brighter than other symbols while the symbol light mode is maintained and the SOS button is pushed.

5. The method of claim 1, wherein a symbol of an operation button pushed is highlighted such that the symbol of the operation button pushed is lighted brighter than other symbols.

6. The method of claim 1, wherein, when a pushing manipulation of the symbol light button is recognized in the symbol light temporary on mode, the method further comprising: switching the symbol light temporary on mode into the symbol light off mode.

7. The method of claim 1, wherein the SOS button has the highest priority and priorities of other operation buttons is set into an order of the symbol light button, an electronic toll collection system power button and remaining operation buttons.

8. The method of claim 7, wherein, when simultaneous push manipulations of plural operation buttons of the remaining operation buttons are recognized, the simultaneous push manipulations are ignored.

9. The method of claim 8, wherein, when the simultaneous push manipulations of the plural operation buttons of the remaining operation buttons are recognized, the lighting devices of all symbols are turned off after the lighting devices of all symbols are turned on for the predetermined time period.

* * * * *